(12) United States Patent
Moidu et al.

(10) Patent No.: US 8,342,756 B2
(45) Date of Patent: Jan. 1, 2013

(54) HERMETIC SEAL BETWEEN A PACKAGE AND AN OPTICAL FIBER

(75) Inventors: Abdul Jaleel K. Moidu, Nepean (CA); Wenlin Jin, Nepean (CA)

(73) Assignee: JDS Uniphase Corporation, Milpitas, CA (US)

( * ) Notice: Subject to any disclaimer, the term of this patent is extended or adjusted under 35 U.S.C. 154(b) by 148 days.

(21) Appl. No.: 12/750,084

(22) Filed: Mar. 30, 2010

(65) Prior Publication Data

US 2011/0170833 A1 Jul. 14, 2011

Related U.S. Application Data

(60) Provisional application No. 61/288,970, filed on Dec. 22, 2009.

(51) Int. Cl.
G02B 6/36 (2006.01)
G02B 6/253 (2006.01)
G02B 6/00 (2006.01)

(52) U.S. Cl. ........... 385/94; 385/88; 385/92; 385/95; 385/137; 385/138

(58) Field of Classification Search ........... 385/88, 385/89, 92–95, 136–138
See application file for complete search history.

(56) References Cited

U.S. PATENT DOCUMENTS

| | | | |
|---|---|---|---|
| 5,177,806 A | 1/1993 | Abbott et al. | 385/76 |
| 5,386,488 A | 1/1995 | Oikawa | 385/92 |
| 5,613,031 A | 3/1997 | Tanabe et al. | 385/138 |
| 5,689,608 A | 11/1997 | Moore et al. | 385/139 |
| 5,970,194 A | 10/1999 | Dunn et al. | 385/95 |
| 6,633,720 B1 | 10/2003 | Xu | 385/138 |
| 6,643,446 B2 | 11/2003 | Moidu et al. | 385/138 |
| 6,788,873 B2 | 9/2004 | Fritz et al. | 385/138 |
| 6,837,075 B1 | 1/2005 | Snowdon et al. | 65/406 |
| 6,922,518 B2 | 7/2005 | Esposito | 385/138 |
| 6,962,338 B2 | 11/2005 | Moidu | 277/316 |
| 2002/0179683 A1 | 12/2002 | Carrier et al. | 228/133 |
| 2003/0190135 A1* | 10/2003 | Moidu et al. | 385/138 |
| 2004/0052481 A1 | 3/2004 | Seguin et al. | 385/94 |
| 2005/0058411 A1 | 3/2005 | Finot et al. | 385/94 |
| 2008/0025677 A1 | 1/2008 | Sasaki | 385/94 |

FOREIGN PATENT DOCUMENTS

| | | |
|---|---|---|
| EP | 0383511 | 8/1990 |
| EP | 0631164 | 9/1998 |
| JP | 2004177613 | 6/2004 |

* cited by examiner

*Primary Examiner* — Brian M. Healy
*Assistant Examiner* — Hung Lam
(74) *Attorney, Agent, or Firm* — Teitelbaum & MacLean; Neil Teitelbaum; Doug MacLean

(57) ABSTRACT

The invention relates to a hermetic feedthrough of an optical fiber into a package for an optical module, that includes a package ferrule hermetically attached to the package or integral therewith, a fiber ferrule hermetically sealed around the optical fiber, and a compression sleeve hermetically sealed around the package ferrule. The compression sleeve is hermetically sealed to the fiber ferrule or integral therewith, and wherein a coefficient of thermal expansion (CTE) of the compression sleeve is greater than a CTE of the package ferrule so that a joint between the compression sleeve and the package ferrule is under compressive stress.

9 Claims, 4 Drawing Sheets

HERMETIC SEAL BETWEEN A PACKAGE AND AN OPTICAL FIBER

CROSS-REFERENCE TO RELATED APPLICATIONS

The present invention claims priority from U.S. Patent Application No. 61/288,970 filed Dec. 22, 2009, which is incorporated herein by reference for all purposes.

TECHNICAL FIELD

The present invention generally to optical fibers and more specifically to a hermetic feedthrough of an optical fiber to an optical module package.

BACKGROUND OF THE INVENTION

A wavelength selective switch (WSS) is used to dynamically attenuate, block, switch and route wavelengths independently. Since WSS are used in management of live optical networks, they have to be highly reliable, which includes great tolerance to mechanical shock and environmental conditions.

A WWS is an N-port module composed of a hermetically sealed block of optics and control electronics; optical fibers are soldered thereto. Hermetic sealing of optical fibers to a package is a key aspect of hermetic packaging technology for WSS modules. However, tensile stresses in the soldered joints often cause cracking of the solder, which compromise the seal and negatively affect compliance with the industry requirements.

Typically, an optical fiber is soldered into a fiber ferrule which has a high coefficient of thermal expansion (CTE) so as to provide a compressive solder-to-fiber seal. The main requirement for a package material is to have a low CTE because of (a) optomechanical stability considerations as optical components may be rigidly attached to the package; (b) thermally match any low CTE ceramic/glass material that may be part of the package. The conflicting CTE requirements for a package and a fiber ferrule pose a challenge to reliability of the package to fiber-ferrule seal; namely presence of large tensile stresses in the seal causing premature fatigue failure of the solder joint under thermal cycling.

An object of the present invention is to eliminate, or at least minimize, negative effects of tensile stress between an optical fiber ferrule and a package and to provide a hermetic feedthrough of an optical fiber and a package, and a method of forming thereof.

SUMMARY OF THE INVENTION

Accordingly, the present invention relates to a hermetic feedthrough of an optical fiber into a package for an optical module, comprising: a package ferrule hermetically attached to the package or integral therewith, a fiber ferrule hermetically sealed around the optical fiber, and a compression sleeve hermetically sealed around the package ferrule; wherein the compression sleeve is hermetically sealed to the fiber ferrule or integral therewith, and wherein a coefficient of thermal expansion (CTE) of the compression sleeve is (a) greater than a CTE of the package ferrule so that a joint between the compression sleeve and the package ferrule is under compressive stress, and (b) largely matched to the CTE of the fiber ferrule so as to minimize stress at the interface between the compression sleeve and fiber ferrule.

Another aspect of the present invention relates to providing a method for forming a hermetic feedthrough of an optical fiber into an optical module package, which includes providing the optical fiber mounted and soldered inside the fiber tube; brazing or soldering the fiber tube into the spacer; inserting the spacer into the package ferrule; simultaneously the compression sleeve is mounted around the external surface of the package ferrule; and, brazing or soldering an integral element formed of the compression sleeve and the spacer to the package ferrule.

Another feature of the present invention provides a method of fabricating a hermetic feedthrough for an optical fiber into an optical module package. The method includes providing the optical fiber mounted and soldered inside a fiber ferrule; soldering the fiber ferrule into a portion of the compression sleeve; and, soldering another portion of the compression sleeve around the package ferrule.

BRIEF DESCRIPTION OF THE DRAWINGS

The invention will be described in greater detail with reference to the accompanying drawings, wherein.

DETAILED DESCRIPTION

Figure 1A:
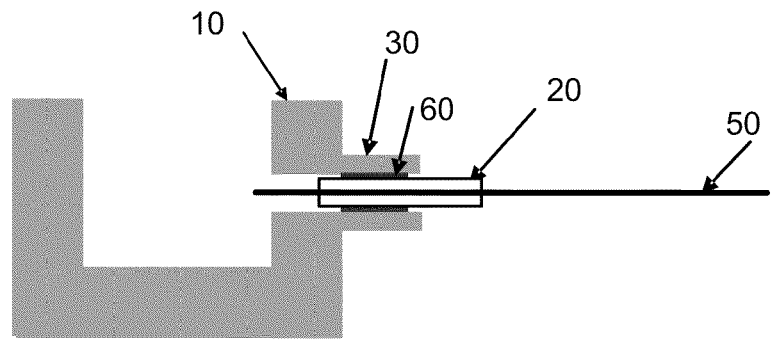
FIG. 1A is a cross-section of a conventional feedthrough design including an integrated package ferrule.
Figure 1B:
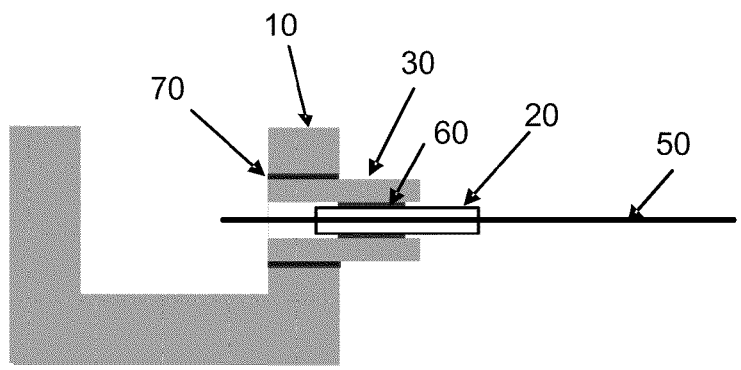
FIG. 1B is a cross-section of a conventional feedthrough design including a package ferrule sealed to a package.

FIGS. 1A and 1B show a conventional hermetic feedthrough between an optical fiber and a package housing an optical device. An optical fiber 50 is attached to a package 10 using a fiber ferrule 20 and a package ferrule 30. Conventionally, the package 10 and the package ferrule are made of low-CTE material(s) and the fiber ferrule is made of high-CTE material. By way of example, the package 10 is made of Kovar (CTE ~5.5 ppm/C), the fiber ferrule 20 is made of brass (CTE ~20 ppm/C), and the package ferrule 30 is made of the same material as the package 10.

FIG. 1A shows the package ferrule 30 integrated with the package 10, and FIG. 1B shows the package ferrule 30 brazed/soldered onto the package 10 with a joint 70. Typically, the package ferrule 30 is made of the same material as the package 10 so as to avoid thermally induced stress in the joint 70 therebetween. However, a joint 60 between the fiber ferrule 20 and the package ferrule 30 is under significant tensile stress: when portions of the fiber ferrule 20 and the package ferrule 30 adjacent to the solder joint 60 cool below the soldering temperature, the package ferrule 30, because of its low CTE, prevents contraction of the fiber ferrule 20 made of a high CTE material. The tensile stress "tears apart" the joint 60 and causes its deterioration. Since conventionally used solders have a limited fatigue life, it is highly desirable to minimize tensile stress in the joint.

Figure 2:
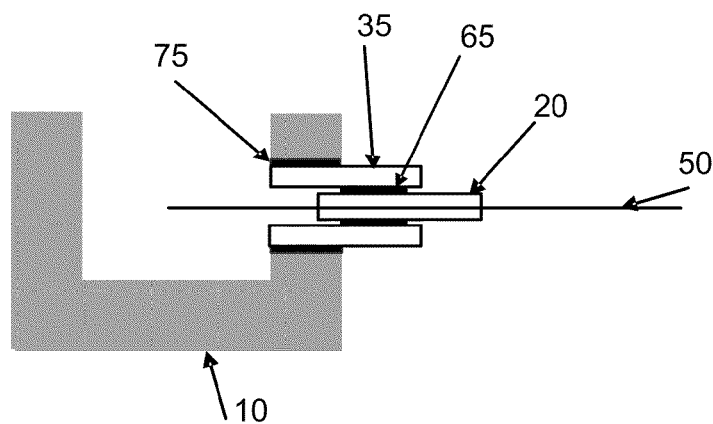
FIG. 2 is a cross-section of a hermetic feedthrough including a high-CTE package ferrule.

A package ferrule 35 shown in FIG. 2 is made of a high CTE material, similar to that of the fiber ferrule 20, e.g. brass or Aluminum, so that thermal stress is minimal in the joint 65. The high CTE package ferrule 35 may be brazed/soldered onto the low CTE package 10; consequently, a joint 75 experiences high tensile stresses. This presents a problem as the package to package-ferrule joint requires a high temperature in the process hierarchy, as it is done prior to the fiber-ferrule to package-ferrule soldering.

Figure 3:
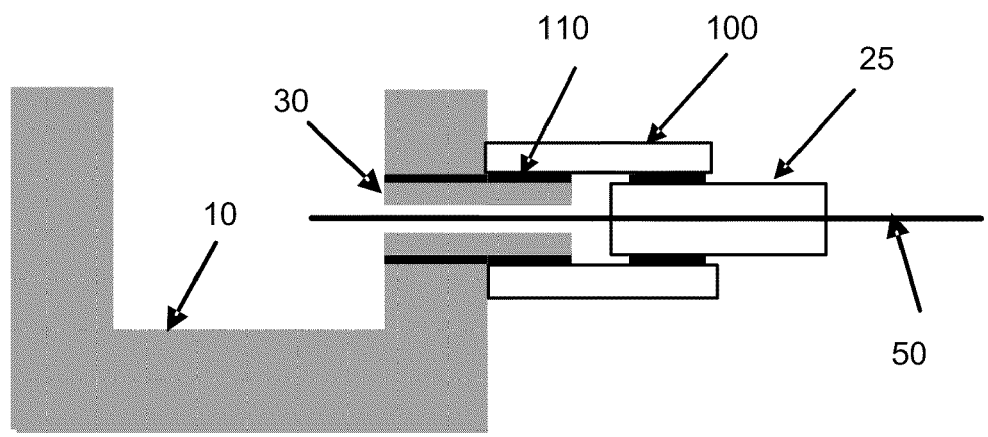
FIG. 3 is a cross-section of a hermetic feedthrough in accordance with one embodiment of this invention.

With reference to FIG. 3, a hermetic feedthrough includes a compression sleeve 100 made of high-CTE material. The compression sleeve 100 is hermetically sealed around the low CTE package ferrule 30. The CTE of the compression sleeve 100 is greater than the CTE of the package ferrule 30 so as to create compressive stress in a joint 110 between the compression sleeve 100 and the package ferrule 30, thereby enhancing fatigue reliability of the seal under thermal cycling. The compressive stress is generated in the compressive joint 110 as the high CTE material of the sleeve 100 squeezes the low CTE material of the package ferrule 30 in radial, tangential and longitudinal directions. The length of the braze/solder joint 110 does not need be large in this case due to compressive state of stress.

With regards to this invention, hermetic sealing of two components together may be done by brazing or soldering, which depends on the materials to be sealed. In most cases they are soldered using relatively low temperature solders such as InSn, at ~120 C. The soldering temperature of the compression sleeve is less than that of the optical fiber solder to avoid reflow of that joint during the compression seal soldering.

Figure 3A:
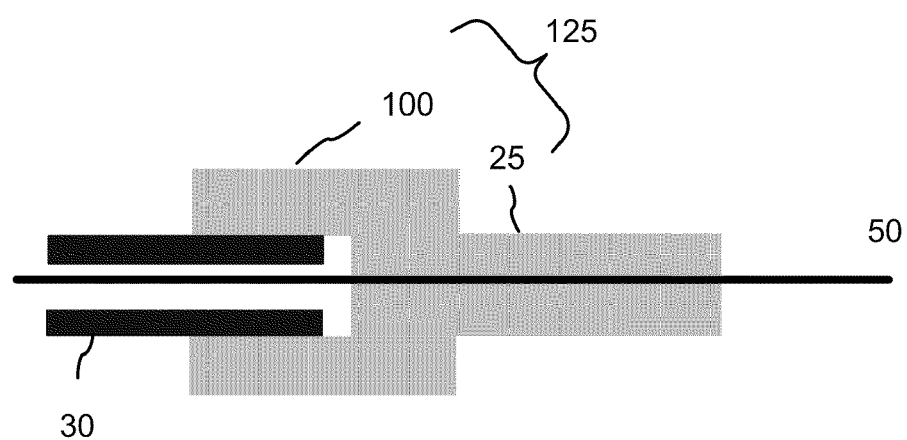
FIG. 3A is a cross-section of a hermetic feedthrough in accordance with one embodiment of this invention.

A fiber ferrule 25 is hermetically sealed around an optical fiber 50 and also it is sealed, i.e. brazed or soldered, inside the sleeve ferrule 100. The fiber ferrule 25 and the compression sleeve 100 are made of high-CTE materials; they may be made of a same material so as to eliminate stress therebetween; or they may be integral parts of an integrated ferrule 125 shown in FIG. 3A. In the event the fiber ferrule 25 and the compression sleeve 100 are made of different materials, it is preferred that CTE of the compression sleeve were not less than a CTE of the fiber ferrule 25 so as to avoid tensile stress in a joint therebetween. In a less preferred case, if the CTE of the compression sleeve 100 is less than the CTE of the fiber ferrule 25, the difference should be within approximately 3 ppm/C to avoid significant tensile stresses.

The low CTE package ferrule 30 may be integral with the package 10 or sealed thereto as shown in FIGS. 1A and 1B. Preferably, the package 10 and package ferrule 30 are thermally matched, i.e. they have equal CTEs, which is always the case when they are made of a same material.

In the embodiment shown in FIG. 3, the external diameters of the fiber ferrule 25 and the package ferrule 30 are practically the same and typically are in the range of 1.5 mm to 2.5 mm; they correspond to the internal diameter of the sleeve 100, leaving space for the solder joint 110. A first length part of the compression sleeve 100 is hermetically sealed around the fiber ferrule 25 and a second length part of the compression sleeve 100 is hermetically sealed around the package ferrule 30.

The length of the fiber ferrule 25 typically varies between 10 mm and 20 mm and the package ferrule 30 may protrude from the package wall by approximately 6 mm. Wall thicknesses of the fiber ferrule 25, the package ferrule 30, and the sleeve 100 depend on the materials used and may vary in the range of 0.5 to 1 mm.

For more certainty, the terms "high-CTE" and "low-CTE" used in this application relate to a first and a second materials such that a CTE of the first material is greater than a CTE of the second material. The difference in the CTE's may be greater than 5 ppm/C to create compression seal, but the difference is 10-15 ppm/C is more preferable.

The package 10 and package ferrule 30 may be made of low-CTE materials which have a CTE less than 10 ppm/C and preferably less than 8 ppm/C, such as kovar and invar alloys.

Typical materials for the fiber ferrules 20 and 25 and the sleeves 100 and 200 (FIG. 4) have a high CTE, i.e. greater than 13 ppm/C and preferably greater than 20 ppm/C; the materials may include aluminum, copper, and brass.

Figure 4:
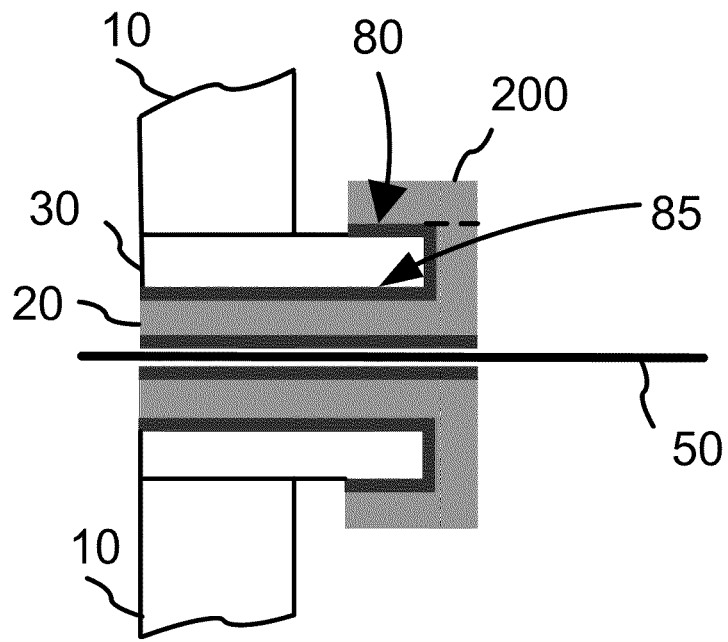
FIG. 4 is a cross-section of a hermetic feedthrough in accordance with one embodiment of this invention.

The difference in CTE between the sleeve 100 and the package ferrule 25, or the sleeve 200 and the package ferrule 20 shown in FIG. 4, may be as little as 1 ppm/C in order to avoid tensile stress in the joints. Preferably, the difference is above 5 ppm/C so as to produce significant compressive stress. In our practice, the low-CTE materials being kovar and invar and high-CTE materials being aluminum and brass, the CTE difference is between 10 and 15 ppm/C. The actual minimum CTE difference is dependent on the solder thickness between the sleeve and package ferrule; it is conceivable to have even less than 5 ppm/C difference if the solder thickness is extremely thin, e.g. 5 um.

A method of fabricating a hermetic feedthrough for the optical fiber 50 into an optical module package 10 as shown in FIG. 3 comprises: providing the optical fiber 50 mounted and soldered inside the fiber ferrule 25; by way of example a BiSn solder is used and the fiber ferrule 25 is made of brass; brazing or soldering the fiber ferrule 25 into a portion of the compression sleeve 100; and, brazing or soldering another portion of the compression sleeve 100 around the package ferrule 30.

Alternatively, the compression sleeve 100 may first sealed to the package ferrule 30, and then the fiber ferrule 25 with the fiber 50 mounted therein is inserted and brazed or soldered to the sleeve 100.

In another embodiment, a hermetic feedthrough is formed using an integrated ferrule shown in grey in FIG. 4. The integrated ferrule includes a fiber ferrule portion 20, hermetically sealed around the optical fiber 50, and a compression sleeve portion 200, hermetically sealed around the package ferrule 30. A CTE of the integrated ferrule and thus of the compression sleeve 200 is greater than a CTE of the package ferrule 30 so as to form a compressive joint 80 as discussed above with reference to FIG. 3.

The integrated ferrule, or at least a portion thereof, has "U"-shaped cross section, the fiber ferrule 20 forming one arm of the "U," and the compression sleeve 200 forming another arm of the "U;" an end of the package ferrule 30 is inserted into the opening of the "U" as shown in FIG. 4. The integrated ferrule connects the fiber ferrule 20 and the compression sleeve 200 and covers an external, i.e. distal from the package, edge of a seal joint 85 between the low-CTE package ferrule 30 and the high-CTE fiber ferrule 20, thus preventing contamination of the package interior through the joint 85 which may be subjected to tensile stress.

The materials and other parameters suitable for the design shown in FIG. 3 are also applicable to the embodiments shown in FIGS. 4-7. In particular, the package ferrule 30 may be sealed to the package 10 or integral therewith.

In one embodiment, the fiber ferrule is formed of two or more parts sealed together; an internal part sealed to the optical fiber, and an external part sealed to the compression sleeve as shown in FIG. 3 or to the package ferrule as shown in FIG. 4.

Figure 5:
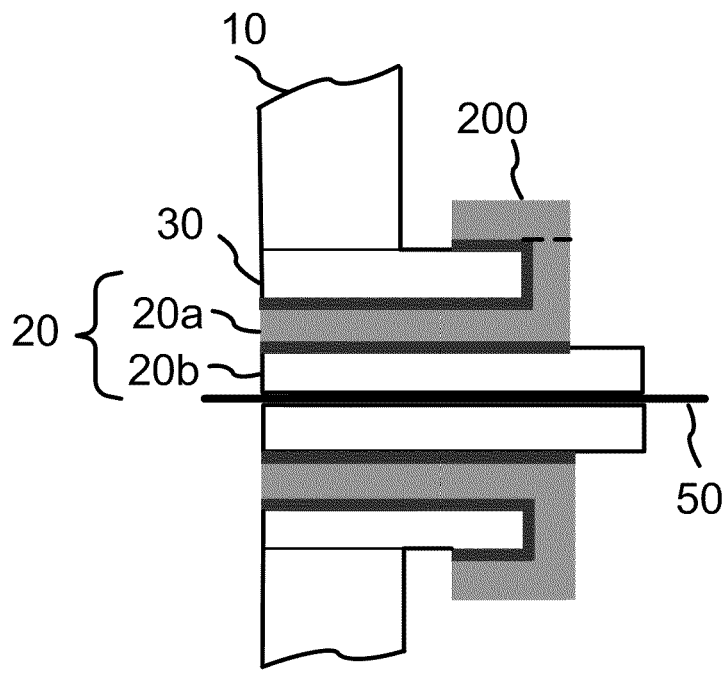
FIG. 5 is a cross-section of a hermetic feedthrough in accordance with one embodiment of this invention; and, FIG. 6 is a partially dissected isometric view of the hermetic feedthrough shown in FIG. 5.

With reference to FIG. 5, an inner ferrule 20b and a spacer 20a constitute a fiber ferrule 20 which may replace the fiber ferrule shown in FIG. 4. In the event the inner ferrule 20b and the spacer 20a are made of different materials, care should be taken that CTE of the spacer 20a is not less than CTE of the inner ferrule 20b. The spacer 20a is integral with the compression sleeve 200. The integrated ferrule in this case is formed of the inner ferrule 20b, the spacer 20a, and the compression sleeve 200.

Figure 6:
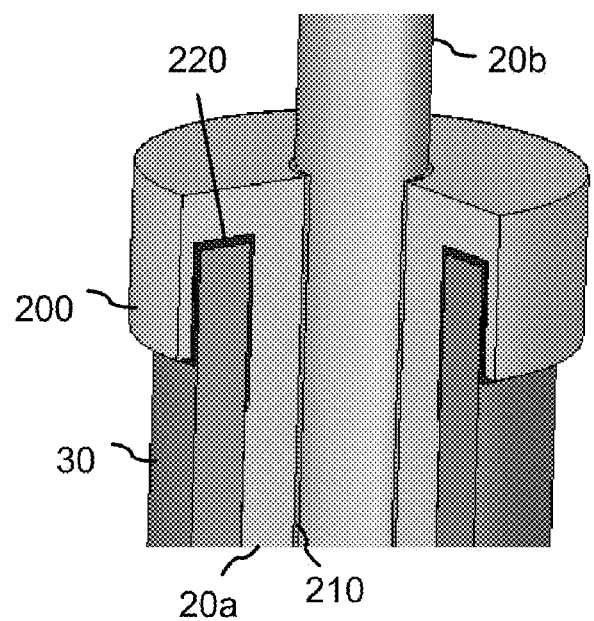

FIG. 6 illustrates the same embodiment shown in FIG. 5. The spacer 20a is designed as an adaptor between the high CTE internal ferrule, or tube, 20b and the low CTE package ferrule 30, and forms a hermetic al seal with two solder joints connecting to the tube 20b and ferrule 30 respectively. The thermal coefficient of the spacer 20a is chosen to be close to that of the optical fiber tube 20b so as to minimize thermal stress in the solder joint 210 between the tube 20b and spacer 20a. The CTE of the spacer 20a is no less than the CTE of the optical fiber tube 20b so as not to create tensile stress in the joint 210 therebetween.

The cross section of a solder joint 220, which includes joint portions 80 and 85 shown in FIG. 4, between the spacer 20a, the compression sleeve 200 and low-CTE ferrule 30 is designed in a "U" shape. Since the thermal expansion of the spacer 20a and the compression sleeve 200 is higher than that of the package ferrule 30, during cooling down of the seal after the solder joint 220 has been formed at high temperature, the contraction of the spacer 20a and the compression sleeve 200 is faster than that of the package ferrule 30. Consequently, the solder joint 220 at the outer arm of the "U" is under compressive stress. The internal arm of the "U" is protected from contamination the same way as it is discussed above with reference to the joint portion 85 in FIG. 4.

Figure 7:
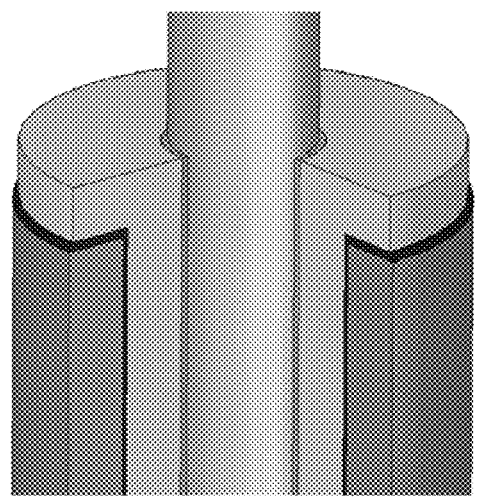
FIG. 7 is an illustration of a feedthrough without a compression sleeve.

The embodiment shown in FIG. 7 has not compression sleeve and thus lacks the advantage of the embodiments shown in FIGS. 3-6.

With reference to FIGS. 5 and 6, a method of fabricating a hermetic feedthrough for an optical fiber 50 into an optical module package 10 comprises:

providing the optical fiber 50 mounted and soldered inside the fiber tube 20b; by way of example a BiSn solder is used and the fiber tube 20b is made of brass;

brazing or soldering the fiber tube 20b into the spacer 20a;

inserting the spacer 20a into the package ferule 30; simultaneously the compression sleeve 200 is mounted onto the external surface of the package ferule 30; and, brazing or soldering an integral element formed of the compression sleeve and the spacer to the package ferrule 30.

Alternatively, the integral element formed of the compression sleeve and the spacer can be brazed or soldered simultaneously to the package ferrule 30 and the fiber tube 20b.

We claim:

1. A hermetic feedthrough of an optical fiber into a package for an optical module, comprising: a package ferrule hermetically attached to the package or integral therewith, and
an integrated ferrule comprising: a fiber ferrule hermetically sealed around the optical fiber, and a compression sleeve hermetically sealed around the package ferrule; wherein a thermal expansion coefficient (CTE) of the compression sleeve is greater than a CTE of the package ferrule so that a joint between the compression sleeve and the package ferrule is under compressive stress; and, wherein a cross-section of the integrated ferrule has a "U"-shaped portion, the fiber ferrule forms one arm of the "U" disposed between the fiber and the package ferrule, the compression sleeve forms another arm of the "U", and an end of the package ferrule is inserted into the "U".

2. A hermetic feedthrough as defined in claim 1 wherein the CTE of the compression sleeve is not less than a CTE of the fiber ferrule.

3. A hermetic feedthrough as defined in claim 1 wherein the compression sleeve is integral with at least a portion of the fiber ferrule.

4. A hermetic feedthrough as defined in claim 1 wherein the fiber ferrule comprises two parts sealed together.

5. A hermetic feedthrough as defined in claim 1 wherein the CTE of the compression sleeve is greater than the CTE of the package ferrule by at least 1 ppm/C.

6. A hermetic feedthrough as defined in claim 1 wherein the CTE of the compression sleeve is greater than the CTE of the package ferrule by at least 5 ppm/C.

7. A hermetic feedthrough as defined in claim 1 wherein the package ferrule comprises kovar or invar.

8. A hermetic feedthrough as defined in claim 1 wherein the fiber ferrule comprises one of aluminum, copper, and brass.

9. A hermetic feedthrough as defined in claim 1 wherein the compression sleeve comprises one of aluminum, copper, and brass.

* * * * *